(12) United States Patent  (10) Patent No.: US 7,405,509 B2
Ohashi et al.  (45) Date of Patent: Jul. 29, 2008

(54) LEVER-ARM DISPLACEMENT-INCREASING DEVICE

(75) Inventors: Yoshio Ohashi, Kanagawa (JP); Masaru Uryu, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/514,342

(22) Filed: Sep. 1, 2006

(65) Prior Publication Data

US 2007/0138913 A1 Jun. 21, 2007

Related U.S. Application Data

(63) Continuation of application No. 10/928,158, filed on Aug. 30, 2004, now abandoned.

(30) Foreign Application Priority Data

Sep. 5, 2003 (JP) ............................. 2003-314702

(51) Int. Cl.
*H01L 41/08* (2006.01)
(52) U.S. Cl. ..................................... 310/328
(58) Field of Classification Search ................. 310/328
See application file for complete search history.

(56) References Cited

U.S. PATENT DOCUMENTS

| | | | | |
|---|---|---|---|---|
| 4,435,666 A | * | 3/1984 | Fukui et al. ................. | 310/328 |
| 4,518,887 A | * | 5/1985 | Yano et al. .................. | 310/328 |
| 4,547,086 A | * | 10/1985 | Matsumoto et al. .... | 400/124.16 |
| 4,570,095 A | * | 2/1986 | Uchikawa .................... | 310/328 |
| 4,644,213 A | * | 2/1987 | Shibuya ...................... | 310/328 |
| 4,703,215 A | * | 10/1987 | Asano ......................... | 310/328 |
| 4,706,230 A | * | 11/1987 | Inoue et al. ................. | 367/174 |
| 4,736,131 A | * | 4/1988 | Fujimoto ..................... | 310/328 |
| 4,855,633 A | * | 8/1989 | Shibuya ...................... | 310/328 |
| 5,314,175 A | * | 5/1994 | Izumi et al. ................. | 269/224 |
| 6,759,790 B1 | * | 7/2004 | Bugel et al. ................. | 310/328 |

FOREIGN PATENT DOCUMENTS

| | | |
|---|---|---|
| JP | 9-121574 | 5/1997 |
| JP | 2006-507784 | 3/2006 |

* cited by examiner

*Primary Examiner*—Mark Budd
(74) *Attorney, Agent, or Firm*—Oblon, Spivak, McClelland, Maier & Neustadt, P.C.

(57) ABSTRACT

In a lever-arm displacement-increasing device, two lever arms are joined at one end. The other end of one of the lever arms is connected to a fixed portion that supports the rear end of an actuator element, and the other end of the other lever arm is connected to a rigid connecting portion connected to the front end of the actuator element. The displacement force of the actuator element is transmitted to the lever arms through the connecting portion, and is further transmitted to a joint between the lever arms. The joint functions as an output displacing portion. The joint changes the displacing direction of the actuator element to a direction orthogonal thereto, and produces a displacement larger than the displacement of the actuator element.

13 Claims, 6 Drawing Sheets

LEVER-ARM DISPLACEMENT-INCREASING DEVICE

This application is a Continuation Application of Ser. No. 10/928,158 filed Aug. 30, 2004, and claims priority to Japan 2003-314702 filed Sep. 5, 2003.

BACKGROUND OF THE INVENTION

1. Field of the Invention

The present invention relates to a lever-arm displacement-increasing device for use, for example, in a precise positioning device and a sound-generating actuator in the fields of cars, airplanes, high-precision machining, precise measuring apparatuses, and electronic apparatuses.

2. Description of the Related Art

There is a demand for high-power and compact actuators that produce sound, vibration, or displacement. As a displacement-producing element that satisfies this demand, a magnetostrictive actuator has attracted interest which uses a magnetic material having magnetostrictivity and a rigidity higher than that of a piezoelectric material such as PZT, that is, which uses a magnetostrictive material.

In the magnetostrictive actuator, the magnetostrictive material must be greatly displaced in order to produce great acoustic waves or oscillatory waves. However, in order to greatly displace the magnetostrictive material, a control current must be increased. This increases input power, and also increases the size of the actuator itself.

Japanese Unexamined Patent Application Publication No. 5-236595 discloses magnetostrictive displacement-producing devices that overcome the above problems, and that can efficiently produce a high output and a large displacement. A magnetostrictive displacement-producing device according to an embodiment of the invention disclosed in this publication will now be briefly described with reference to FIG. 6.

In a magnetostrictive displacement-producing device shown in FIG. 6, a driving mechanism is constituted by an actuator element 51 serving as a displacement-producing element having magnetostrictivity, a driving coil 52 extending in the longitudinal direction of the displacement-producing element 51, and a support 53 made of a magnetic pole or a permanent magnet and serving as a magnetic-field generating member. When a control current generated by a displacement control circuit (not shown) is applied to the driving coil 52, the driving coil 52 generates a control magnetic field, and the actuator element 51 expands and contracts in response to field changes. When the support 53 is made of an iron magnetic pole, the efficiency of the applied magnetic field can be increased. When the support 53 is a laminate composed of an iron material and a permanent magnet, a magnetic bias can be applied to the actuator element 51, and controllability is enhanced.

The driving mechanism is fixed to a container 54. An action point 61 of a displacement-transmitting jig 60 in a displacement-increasing mechanism is movably attached to a displacing portion of the actuator element 51. A fulcrum 62 of the displacement-transmitting jig 60 provided in view of the lever ratio is pivotally supported by, for example, a pin. A vibrating member 55 of an output section is fixed in contact with an action point 63 of the displacement-transmitting jig 60. The displacement-producing device having the above structure can produce a large displacement and a high output.

However, the displacement-producing device includes many members such as the driving coil 52, the support 53, the actuator element 51, and the displacement-transmitting jig 60. Therefore, the structure is complicated, and the cost is increased.

The operation of the displacement-producing device will be described from the viewpoints of the fulcrum, the force point, and the action point with reference to FIG. 8. The above displacement-increasing mechanism uses a lever. As shown in FIG. 8, the fulcrum of the lever is disposed ahead of the actuator element 51, and cannot be moved toward the peripheral wall and the rear end of the actuator element 51. That is, it is impossible to freely move the fulcrum of the lever.

Japanese Unexamined Patent Application Publication No. 10-201256 discloses a displacement-increasing mechanism having a simple structure in which the fulcrum of the lever is disposed behind the force point in order to overcome the technical problem of the above-described displacement-producing device. The disclosed displacement-increasing mechanism aims to displace an output displacing portion in a direction orthogonal to the displacing direction of an actuator element and to increase the output from the output displacing portion. The displacement-increasing mechanism will be briefly described with reference to FIG. 7. An actuator element 3 is stored in an actuator-holding space 104 provided in the center of a base 100. Vibration displacement and force are produced by applying a voltage to the actuator element 3, and press a force point 118 of a lever 109.

The displacement and force applied to the force point 118 are increased and transmitted to an action-point hinge 117 of the lever 109 according to the lever principle, and turn an output displacing portion 112, which extends in a direction orthogonal to the center axis of the base 100, upward on a fulcrum hinge 116. Consequently, the output displacing portion 112 is displaced in the direction orthogonal to the center axis of the base 100.

The operation of this displacement-increasing mechanism will be described from the viewpoints of the fulcrum, the force point, and the action point with reference to FIG. 9.

In the displacement-increasing mechanism, the action-point hinge is essential in order that the fulcrum may be disposed behind the force point. As a result, the displacement-increasing mechanism cannot have a linear shape, but must be shaped like a box. In order to increase the degree of freedom in positioning the fulcrum, the box must be enlarged. In other words, the housing must be enlarged, and it is necessary to increase the control current or to increase the size of the actuator element in order to move the large housing.

SUMMARY OF THE INVENTION

In view of the increase in size of the housing and problems in motion of the housing caused by increasing the degree of freedom of the fulcrum, an object of the present invention is to provide a lever-arm displacement-increasing device in which the displacing direction of an output displacing portion is orthogonal to the displacing direction of an actuator element, the output displacing portion outputs a displacement larger than the displacement of the actuator element, and the position of the fulcrum can be freely determined.

In order to achieve the above object, according to an aspect of the present invention, the present invention provides a lever-arm displacement-increasing device including an actuator element; a first lever arm connected at one end to the actuator element by a connecting portion; and a second lever arm joined at one end to the other end of the first lever arm by a junction, wherein the displacing direction of the junction is orthogonal to the displacing direction of the actuator element.

Preferably, the junction functions as a displacing portion.

Preferably, a fulcrum is provided at the other end of the second lever arm, and is fixed offset from the connecting portion toward the actuator element.

Preferably, the first lever arm and the second lever arm are parallel to each other.

Preferably, the lever-arm displacement-increasing device includes a plurality of units each including the first lever arm, the second lever arm, and the junction, thereby ensuring a larger displacement.

Preferably, a displacing portion protrudes from the junction.

Further objects, features and advantages of the present invention will become apparent from the following description of the preferred embodiments with reference to the attached drawings.

DESCRIPTION OF THE PREFERRED EMBODIMENTS

Figure 1A:
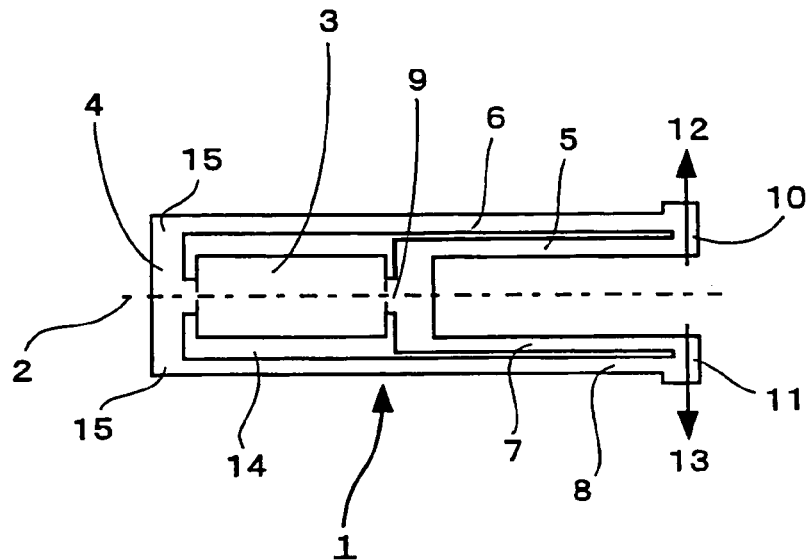
FIGS. 1A and 1B are a front view and a perspective view, respectively, of a lever-arm displacement-increasing device according to a first embodiment of the present invention.

Preferred embodiments of the present invention will be described below with reference to the attached drawings. In these drawings, the same reference numerals denote equivalent or corresponding components.

Figure 1B:
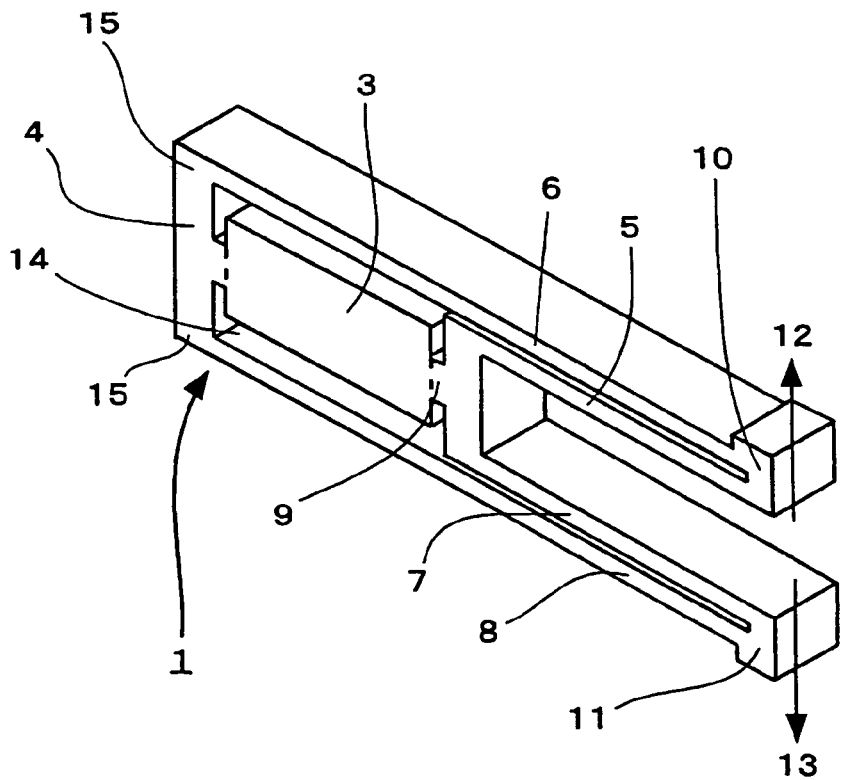

FIGS. 1A and 1B are a front view and a perspective view, respectively, of a lever-arm displacement-increasing device according to a first embodiment of the present invention.

In the first embodiment, a lever-arm displacement-increasing device 1 includes an actuator-holding space 14 for storing an actuator element 3 that displaces along a center axis 2 of the device. The actuator element 3 is, for example, a piezoelectric, electrostrictive, or magnetostrictive element.

The lever-arm displacement-increasing device 1 also includes a pair of first and second upper lever arms 5 and 6 and a pair of first and second lower lever arms 7 and 8.

The actuator element 3 is stored in the actuator-holding space 14, and a rear end thereof is fixed to a fixed portion 4. It is preferable that the fixed portion 4 have as high a strength as possible, and have a thickness more than or equal to double the thickness of the lever arms 5, 6, 7, and 8.

A front end of the actuator element 3 is joined to a connecting portion 9 that is made of a rigid material having a strength higher than that of the lever arms 5, 6, 7, and 8.

While the vertical lengths of a connection between the rear end of the actuator element 3 and the fixed portion 4, and the connecting portion 9 shown in FIGS. 1A and 1B are smaller than the vertical length of the actuator element 3, they may be equivalent thereto.

The second upper lever arm 6 and the second lower lever arm 8 are also connected at one end to the fixed portion 4. The first upper lever arm 5 and the first lower lever arm 7 are connected at one end to the rigid connecting portion 9.

Fulcrums 15 are provided at the connections between the fixed portion 4, and the second upper lever arm 6 and the second lower lever arm 8. The fulcrums 15 will be described in detail later.

The other end of the second upper lever arm 6 remote from the fixed portion 4 and the other end of the first upper lever arm 5 remote from the connecting portion 9 are joined at a junction 10 having a high strength and a thickness larger than the thickness of the lever arms 5, 6, 7, and 8. Similarly, the other end of the second lower lever arm 8 remote from the fixed portion 4 and the other end of the first lower lever arm 7 remote from the connecting portion 9 are joined at a junction 11.

A description will now be given of the operation of the lever-arm displacement-increasing device 1 of the first embodiment.

A displacement and a force produced from the actuator element 3 along the center axis 2 are transmitted to the rigid connecting portion 9. The transmitted displacement and force are further transmitted to the junctions 10 and 11 through the first upper lever arm 5 and the first lower lever arm 7 joined to the connecting portion 9.

For example, when a voltage is applied to the actuator element 3, a displacement and a force are produced on the outer side in the lateral direction, and displace the connecting portion 9 to the right in FIG. 1A. The displacement of the connecting portion 9 is transmitted to the joints 10 and 11 through the first upper lever arm 5 and the first lower lever arm 7.

In this case, the displacement and force from the actuator element 3 are turned 90 degrees, and are directed in an upward direction 12 via the junction 10 between the first upper lever arm 5 and the second upper lever arm 6, and the degree of displacement is increased. The displacement and force are also turned 90 degrees, and are directed in a downward direction 13 via the junction 11 between the first lower lever arm 7 and the second lower lever arm 8, and the degree of displacement is increased. That is, the junctions 10 and 11 function as displacing portions, and increase the displacement.

Since the transmitted displacement acts in the upward and downward directions in this way, a large displacement can be produced even when the actuator element 3 is slightly displaced.

In the present invention, the connections between the fixed portion 4, and the second upper lever arm 6 and the second lower lever arm 8 function as the fulcrums 15, the connecting portion 9 between the actuator element 3, and the first upper lever arm 5 and the first lower lever arm 7 functions as the force point, and the joint 10 between the first upper lever arm 5 and the second upper lever arm 6 functions as the action point. The joint 11 between the first lower lever arm 7 and the second lower lever arm 8 similarly functions as the action point.

Figure 2A:
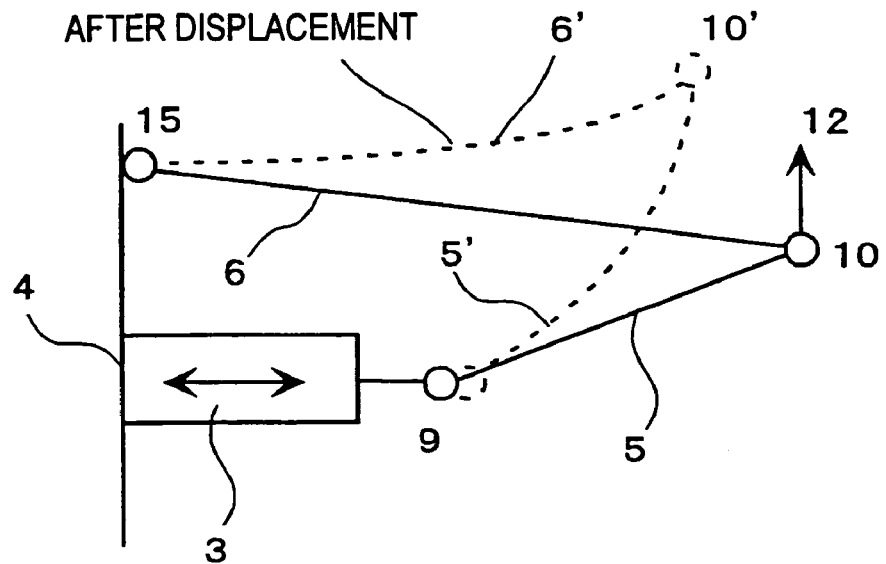
FIGS. 2A and 2B are explanatory views showing an operating manner of the lever-arm displacement-increasing device, respectively, when a rear end of an actuator element is aligned with the fulcrum and when the rear end is not aligned with the fulcrum.
Figure 2B:
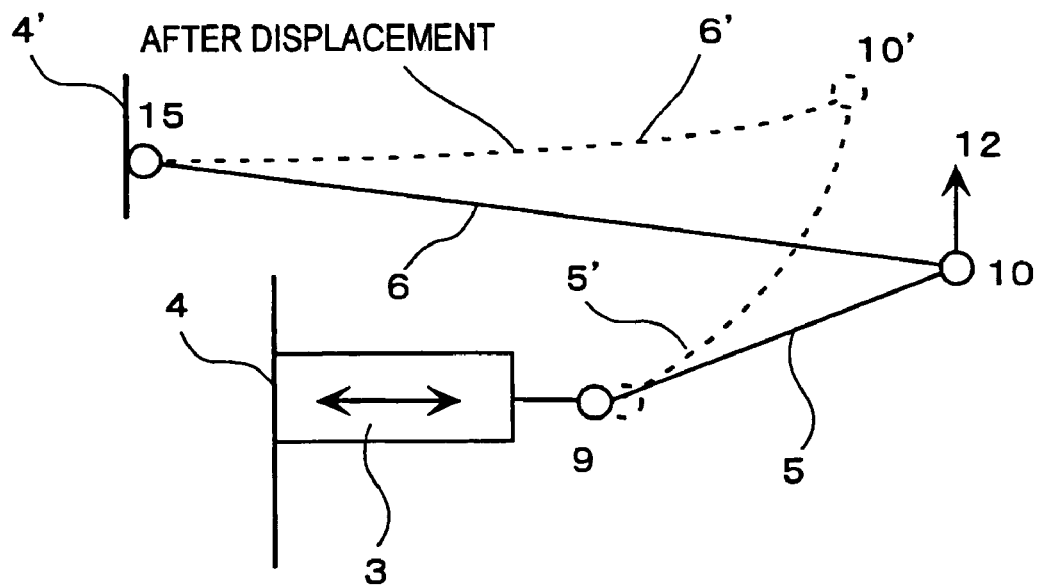

The operating manner of the lever-arm displacement-increasing device 1 will be described in more detail with reference to FIGS. 2A and 2B. FIGS. 2A and 2B show the operating manner of only the upper part of the lever-arm displacement-increasing device 1, and the lower part also operates in a similar manner.

Referring to FIG. 2A, the second lever arm 6 is connected to the fixed portion 4 to which the rear end of the actuator element 3 is fixed. When a voltage is applied to the actuator element 3, a displacement transmitted to the connecting portion (force point) 9 attempts to displace the junction 10 in the same direction as the direction of displacement of the actuator element 3 through the first upper lever arm 5 joined to the connecting portion 9. However, since the junction 10 is also joined to the second upper lever arm 6 that is connected to the fixed portion 4, the second upper lever arm 6 is displaced in the upward direction 12 so as to pull the junction (action point) 10. That is, the connection between the second upper lever arm 6 and the fixed portion 4 functions as the fulcrum 15. As a result, the action point 10 shifts to a position 10', and the first upper lever arm 5 and the second upper lever arm 6 shift to positions 5' and 6'.

As shown in FIG. 2A, when the first upper lever arm 5 and the second upper lever arm 6 deflect, the direction in which the displacement and force act is changed from the horizontal direction to the vertical direction. For this reason, even when the fulcrum 15 is provided behind the actuator element 3, as shown in FIG. 2B, the horizontal displacement can be converted into a vertical displacement as long as the fulcrum 15 is disposed at a position such as to deflect the lever arms. In short, the position of the fulcrum can be determined with a high degree of flexibility.

Second and third embodiments of the present invention will now be described with reference to FIGS. 3A, 3B, 4.

Figure 3A:
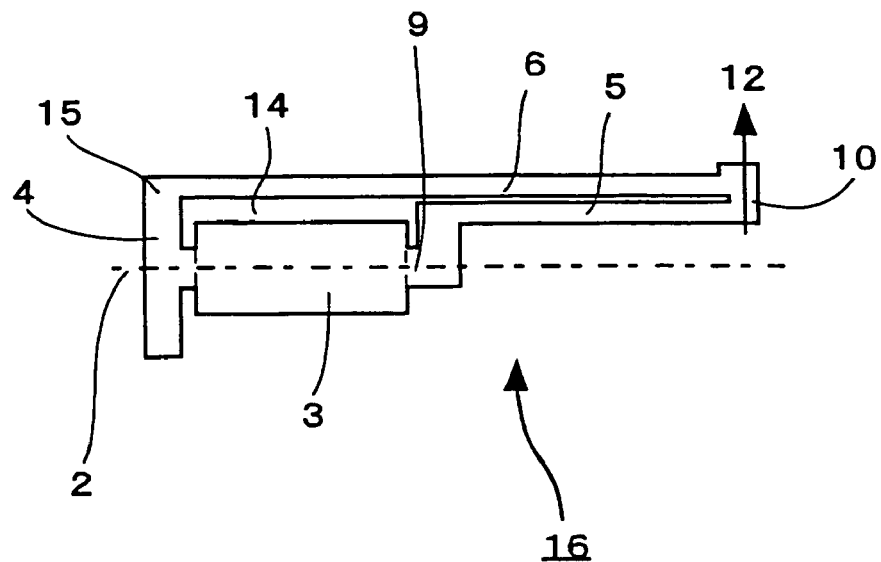
FIGS. 3A and 3B are a front view and a perspective view, respectively, of a lever-arm displacement-increasing device according to a second embodiment of the present invention.
Figure 3B:
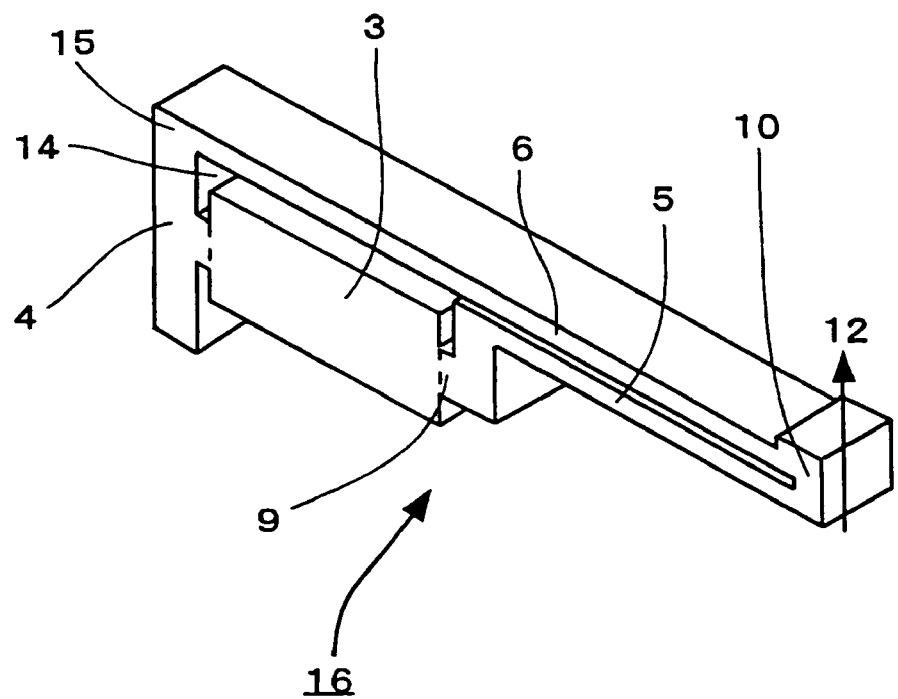

FIGS. 3A and 3B are a front view and a perspective view, respectively, of a lever-arm displacement-increasing device according to a second embodiment of the present invention. A lever-arm displacement-increasing device 16 of the second embodiment is different from the above-described first embodiment shown in FIGS. 1A and 1B in having only one pair of lever arms, and the lever-arm displacement-increasing device 16 is used to produce output in one direction.

In the second embodiment, a displacement and a force produced from an actuator element 3 along a center axis 2 are transmitted to a connecting portion 9 made of a rigid material, and are then transmitted to a junction 10 through a first upper lever arm 5 joined to the connecting portion 9.

In this case, the displacement and force of the actuator element 3 are turned 90 degrees through the junction 10 between the first upper lever arm 5 and a second upper lever arm 6, and are directed in an upward direction 12, and the degree of displacement is increased. That is, the junction 10 functions as a displacing portion, and increases the displacement.

Figure 4:
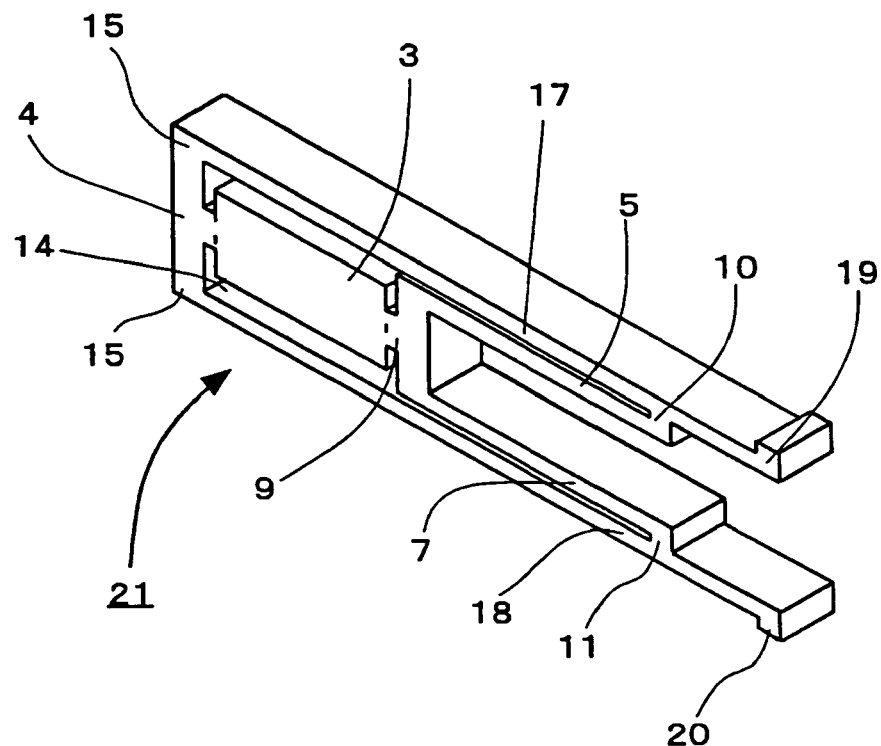
FIG. 4 is a perspective view of a lever-arm displacement-increasing device according to a third embodiment of the present invention.

In a lever-arm displacement-increasing device 21 according to a third embodiment shown in FIG. 4, a second upper lever arm 17 and a second lower lever arm 18 protrude from the side of a connecting portion 9 toward junctions 10 and 11. In this structure, action points shift from the junctions 10 and 11 to displacing portions 19 and 20 at the front ends of the second upper lever arm 17 and the second lower lever arm 18. Therefore, a small displacement can be converted into a large displacement.

While the displacing portions 19 and 20 are formed by protruding the second upper and lower lever arms 17 and 18 in the above third embodiment, they may be formed by protruding first upper and lower lever arms 5 and 7.

In order to ensure a high displacement increasing ratio (output displacement/displacement of the actuator element), it is important to arrange the first and second upper lever arms 5 and 17 parallel to each other with a gap smaller than the thickness of the lever arms therebetween, and to similarly arrange the first and second lower lever arms 7 and 18. Further, the displacement can be further increased by increasing the lengths of the lever arms (5, 7, 17, and 18), as shown in FIG. 4.

Figure 5:
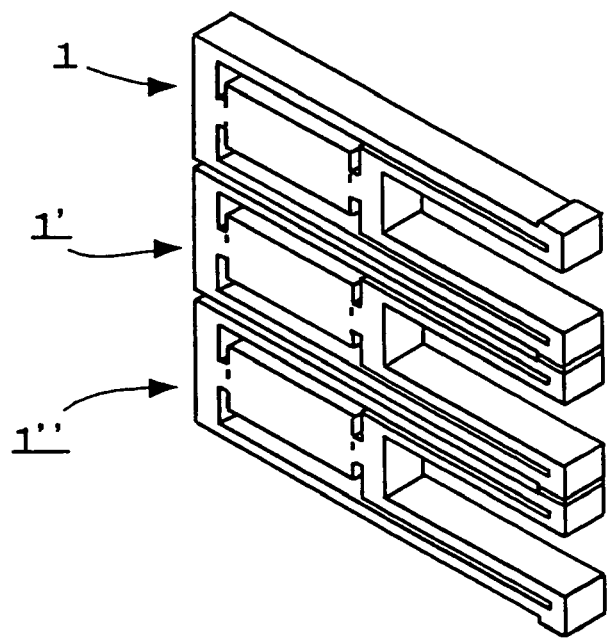
FIG. 5 is a perspective view showing a case in which a plurality of lever-arm displacement-increasing devices of the present invention are stacked.
Figure 6:
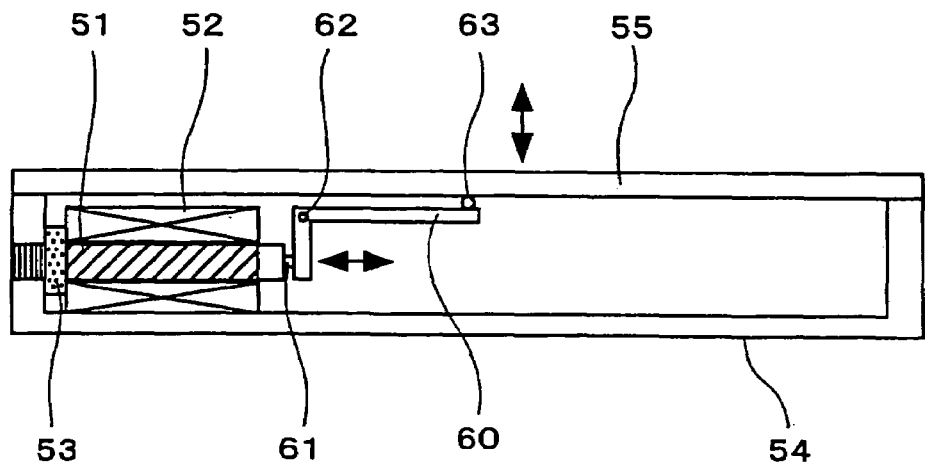
FIG. 6 is a schematic view of a first example of a conventional displacement-increasing device.
Figure 7:
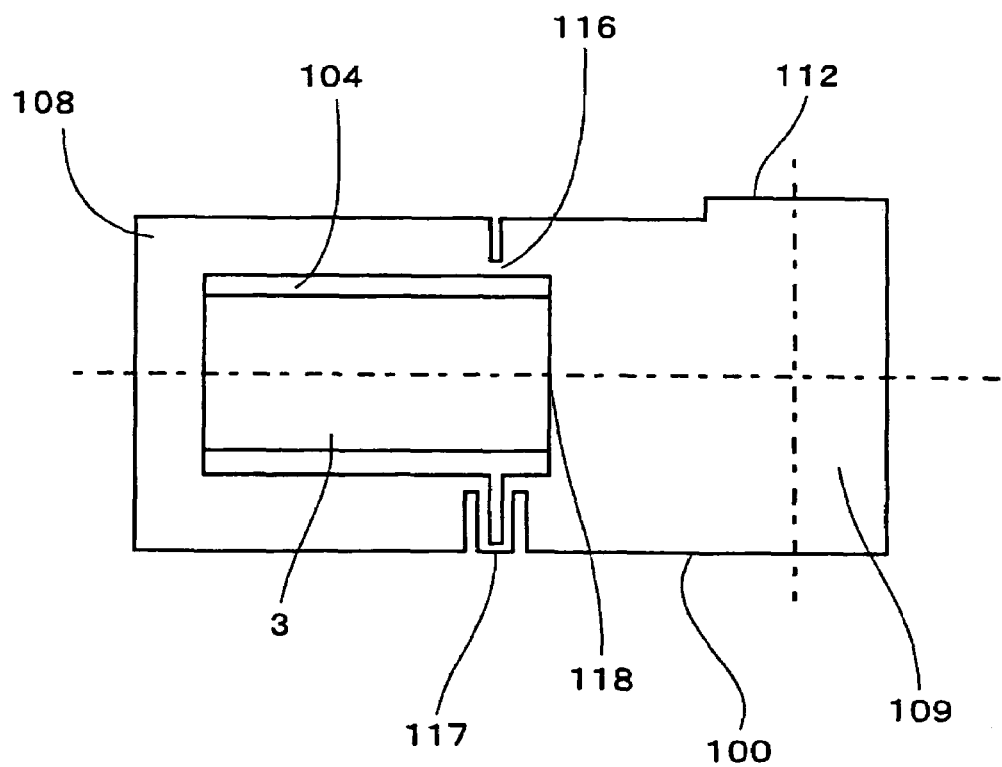
FIG. 7 is a schematic view of a second example of a conventional displacement-increasing device.
Figure 8:
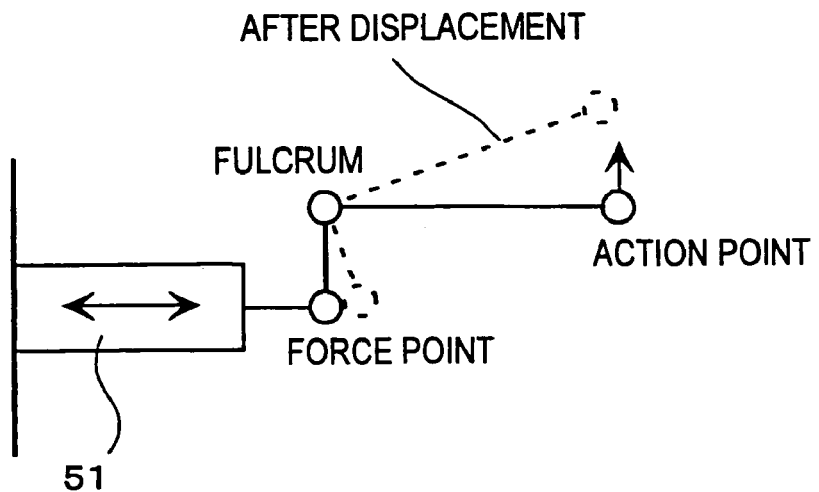
FIG. 8 is an explanatory view showing an operating manner of the first example of the conventional displacement-increasing device.
Figure 9:
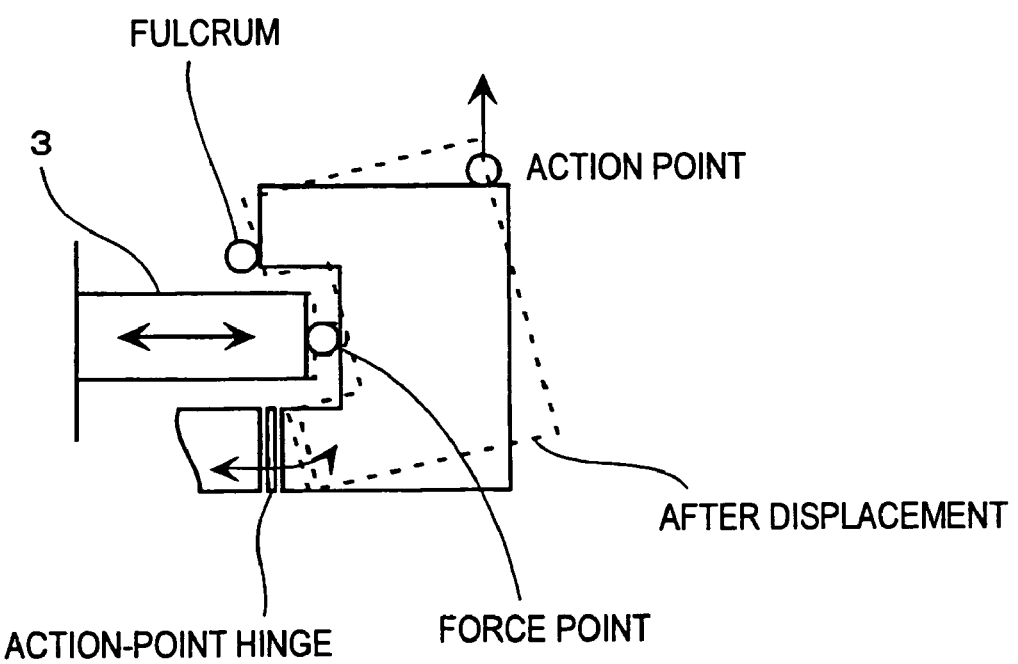
FIG. 9 is an explanatory view showing an operating manner of the second example of the conventional displacement-increasing device.

The displacement increasing ratio can be further increased by stacking a plurality of units 1, 1', and 1" each including a first lever arm (5 or 7), a second lever arm (6 or 8), and a junction (10 or 11), as shown in FIG. 5.

In this lever-arm displacement-increasing device, different voltages may be applied depending on the circumstances. For example, a DC voltage may be applied for static displacement, or an AC voltage may be applied for dynamic displacement.

In the above-described lever-arm displacement-increasing device, the output displacing portion can produce a large displacement in a direction orthogonal to the displacing direction of the actuator element. Also, since the lever-arm displacement-increasing device has a single-piece structure, it can be easily produced, and the production cost can be reduced.

Since the displacement is not increased based on the lever principle, but is increased by the lengths of the lever arms, the position of the fulcrum can be freely determined, the degree of freedom in design is increased, and the range of applications can be widened.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lever-arm displacement-increasing device, comprising:
   an actuator element;
   a first lever arm connected at a first end to the actuator element through a connecting portion;
   a second lever arm joined at one end to a second end of the first lever arm by a junction such that a displacing direction of the junction is orthogonal to a displacing direction of the actuator element; and
   a fulcrum provided at an other end of the second lever arm and fixed further than the connection portion from the junction.

2. The lever-arm displacement-increasing device according to claim 1, wherein the junction functions as a displacing portion.

3. The lever-arm displacement-increasing device according to claim 1, wherein a displacing portion protrudes from the junction joining the first lever arm and the second lever arm.

4. The lever-arm displacement-increasing device according to claim 1, wherein the first lever arm and the second lever arm are parallel to each other.

5. The lever-arm displacement-increasing device according to claim 1, wherein a plurality of units each including the first lever arm, the second lever arm, and the junction are provided.

6. A lever-arm displacement-increasing devices, comprising:
- an actuator element;
- a fixed portion for fixing a rear end of the actuator element;
- a first lever arm connected at a first end to a front end of the actuator element through a connecting portion;
- a second lever arm connected at one end to a fulcrum; and
- a junction joining a second end of the first lever arm and an other end of the second lever arm such that a displacing direction of the junction is orthogonal to a displacing direction of the actuator element,
- wherein the fulcrum is fixed further than the connecting portion from the junction.

7. The lever-arm displacement-increasing device according to claim 6, wherein the junction functions as a displacing portion.

8. The lever-arm displacement-increasing device according to claim 6, wherein a displacing portion protrudes from the junction joining the first lever arm and the second lever arm.

9. The lever-arm displacement-increasing device according to claim 6, wherein the fulcrum is fixed to the fixed portion.

10. The lever-arm displacement-increasing device according to claim 6, wherein the first lever arm and the second lever arm are parallel to each other.

11. The lever-arm displacement-increasing device according to claim 6, wherein a plurality of units each including the first lever arm, the second lever arm, and the junction are provided.

12. The lever-arm displacement-increasing device according to claim 1, wherein
- the actuator element is not displaced in a first position, and
- the first lever arm and the second lever arm are substantially parallel to a longitudinal axis of the actuator element in the first position.

13. The lever-arm displacement-increasing device according to claim 6, wherein
- the actuator element is not displaced in a first position, and
- the first lever arm and the second lever arm are substantially parallel to a longitudinal axis of the actuator element in the first position.

* * * * *